United States Patent [19]

Garbuny

[11] 4,176,024
[45] Nov. 27, 1979

[54] GAS DYNAMIC REACTION PROCESS AND SYSTEM FOR LASER CHEMISTRY

[75] Inventor: Max Garbuny, Wilkinsburg, Pa.

[73] Assignee: Westinghouse Electric Corp., Pittsburgh, Pa.

[21] Appl. No.: 599,494

[22] Filed: Jul. 28, 1975

[51] Int. Cl.² .............................. B01J 1/10; B01K 1/00
[52] U.S. Cl. .......................... 204/157.1 R; 204/158 R; 204/DIG. 11; 250/527
[58] Field of Search ................ 204/DIG. 11, 157.1 R, 204/162; 250/527

[56] References Cited

U.S. PATENT DOCUMENTS

| 3,227,642 | 1/1966 | Lemelson | 204/DIG. 11 |
| 3,558,877 | 1/1971 | Pressman | 204/DIG. 11 |
| 3,719,454 | 3/1973 | Shang | 204/DIG. 11 |
| 3,740,552 | 6/1973 | Pressman | 204/DIG. 11 |
| 3,944,825 | 3/1976 | Levy | 204/157.1 R |
| 3,969,204 | 7/1976 | Neimann et al. | 204/DIG. 11 |

*Primary Examiner*—Howard S. Williams
*Attorney, Agent, or Firm*—R. D. Fuerle

[57] ABSTRACT

A reaction system is disclosed wherein a moving, unidirectional stream of an activatable gaseous species is produced, the individual members of which have the forward components of their velocities at least 10 times greater than the lateral components of their velocities. The stream is irradiated with substantially monochromatic light having a frequency which activates at least some of the individual members of the species. The activated members can then be reacted with another stream or otherwise utilized.

28 Claims, 2 Drawing Figures

GAS DYNAMIC REACTION PROCESS AND SYSTEM FOR LASER CHEMISTRY

CROSS-REFERENCE TO RELATED APPLICATION

This application is related to application Ser. No. 599,495 filed of even date by D. C. Phillips and M. Garbuny, titled "Apparatus and Method for Producing Stereo-Regular Polymers."

BACKGROUND OF THE INVENTION

When molecules are heated to cause them to undergo chemical reaction, the molecules are excited to many different excitation states. Some states may lead to the desired product while other states lead to undesired by-products or to no reaction at all. It has only recently been found that a laser can be used to excite molecules to very specific excitation states. This is possible because laser light is nearly monochromatic, and, unlike thermal excitation, the molecules are excited by photons of nearly uniform energy and therefore can be excited only to excitation states of the same energy. From these specific states the reaction between the molecules or with other molecules can proceed only in certain well-defined directions. For example, isotopes can be separated because the excitation levels differ slightly for each isotope. The laser excites only one isotope which reacts with another type of molecule and can be chemically separated.

Reactions which would not occur at all under thermal excitation or which would be too expensive under thermal excitation are now often possible or economical using laser chemistry.

While the promises of laser chemistry have caused great interest among scientists, there are still some difficulties which must be overcome before laser chemistry can be used successfully for many chemical reactions. One of the principal problems is the destruction of the specificity of the excitation state. Clearly, if the wavelength of the laser is too broad unwanted excitation states may result which produce unwanted products. However, there are also other ways in which the molecules can be subjected to a broader band of excitation energy than is desired.

First, excited molecules can collide with each other or the reaction product and transfer energy therebetween, resulting in molecules having more or less than the desired energy. Secondly, if the molecule is moving towards or away from the light at the time that it is excited by the light, it will "see" the light as having a greater or lesser frequency, respectively, than it actually has and will be accordingly more or less excited than is desired. These two effects, intermolecular collisions and the Doppler effect, set important limitations on the type of reactions which can be successfully accomplished in laser chemistry.

In addition to line broadening, laser chemistry must also deal with the problem of removing the end products from the reaction zone as quickly as possible to prevent them from reacting with the excited or unexcited molecules to produce undesirable products.

PRIOR ART

U.S. Pat. No. 3,719,454 (FIG. 6 and column 13 lines 5 to 10) discloses the use of a laser to activate a moving gas which reacts with a second gas.

Mr. J. Berry, in a Ph.D. thesis at the University of California at Berkeley in 1970, entitled "Vibrational Energy Distributions Among the Products of Laser Reactions" discloses that chloroacetylene reacts with hydrochloric acid which has been excited by a laser to produce predominately the 1,1-isomer of dichloroethylene.

An article by V. S. Letokhov and A. A. Makarov titled "Kinetics of Excitation of Molecular Vibrations by Infrared Laser Radiation" appears in Soviet Physics JETP, Volume 36, No. 6, June 1973.

An article by Stelio Munari, S. Russo, Gianruo Castello, and Corrado Rossi titled "Radiation-Induced Polymerization of Gaseous Ethylene" appears in the Journal of Polymer Science: Part C, No. 16, Part 7, pages 4149 to 4159 (1967).

An article by N. G. Basov, E. P. Markin, A. N. Oraevskii, A. V. Pankratov, and A. N. Skachkov titled "Stimulation of Chemical Processes by Infrared Laser Radiation" appears in VEPT Lett. Volume 14, pages 165 to 167 (1971).

SUMMARY OF THE INVENTION

I have discovered an apparatus and method which significantly reduce intermolecular collisions by causing the molecules to move rapidly in a stream so that the random distance that the molecules move as they travel in the stream is usually less than the distance between the molecules in the stream. I have also found that in my apparatus and method the Doppler effect is significantly reduced. In this invention, the throughput is large and the product of reaction is removed rapidly from the reaction zone thereby limiting further reaction and interference with the reaction. Because the cross-section is larger, less intense light can be used, saving energy.

This invention, in greatly lessening the problems of intermolecular collisions and Doppler broadening, is capable of enabling reactions to occur which otherwise could not be accomplished using laser chemistry because the excitation level of the desired reaction was too close to other undesired excitation levels. Also, for the same reason, the purity of the product of reactions which were possible can now be improved.

DESCRIPTION OF THE INVENTION

Figure 1:
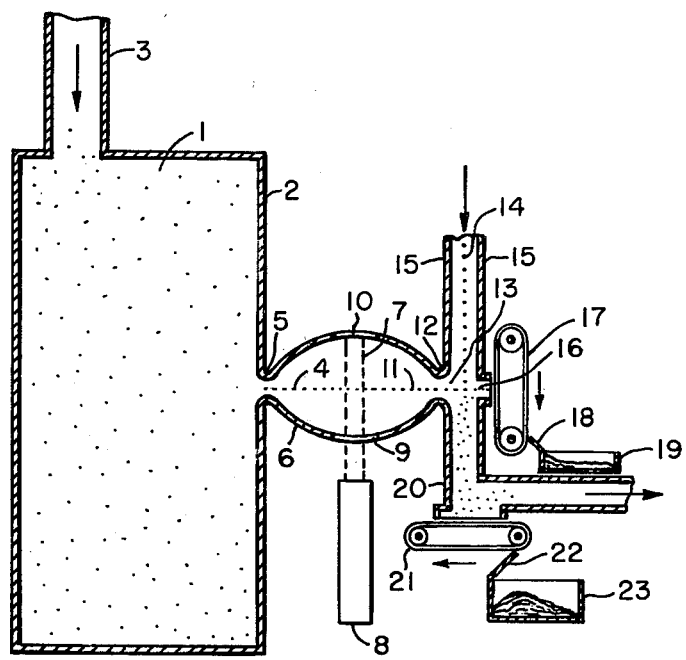
FIG. 1 is a diagrammatic plan view of a certain presently preferred embodiment of a gas dynamic reaction system according to this invention.

This invention uses the fact that a stream of molecules moving in a certain direction with a given flux density, i.e., the number of molecules passing through unit area in unit time, collide with each other the less, the larger is their velocity component in that direction and the less is their velocity component perpendicular to that direction. The invention also uses the fact that such a stream of molecules moving substantially unidirectionally has a very narrow absorption line width, i.e., its response to monochromatic radiation in absorption is limited to a very narrow spectral width, if the radiation is incident perpendicular to the direction of the stream. This is the consequence of several factors. First, the small transverse velocities result in small Doppler broadening. Second, the reduction in the frequency of collisions result in small collision broadening. Third, the large forward velocity results, at fixed flux density, in a correspondingly large average inter-molecular distance, hence in small Stark broadening, i.e. broadening of the linewidth due to molecular electric fields. The linewidth, to which all three factors contribute, may be as low as 10 to 100 megahertz, (or 0.0003 to 0.003 cm$^{-1}$) whereas the linewidth of a stagnant gas at room temperature is typically in the order of a gigahertz due to Doppler broadening alone. On the other hand, linewidths of 10 to 100 megahertz can be matched by tuned lasers at the present state of the art. Such a narrow linewidth of a radiation source in coincidence with a narrow gas line produces very large cross sections of absorption (probability of a desired excitation). Further, it allows a high selectivity of excitation with respect to resonances neighboring in frequency. This fact is of particular importance if the laser-chemical reaction is used for the separation of isotopes.

The use of the apparatus and method of this invention offers the advantage that the number of molecules, N, (the "throughput") arriving at the target or collector per unit area per unit time can be relatively large, since $N=nv$, where n is the density (number of molecules per unit volume) of the gas in the stream and v is the molecular velocity in the direction of the stream. For a given throughput, then, the density may be quite low, while the velocity is high. A low gas density plays a major role in reducing molecular collisions. Here the large absorption cross sections achieved by line narrowing come into play. It is desirable that as large a fraction of the molecules in the gas stream be excited as possible. It is also desirable that this be accomplished with the least possible amount of radiation (number of photons). When radiation passes through a slab of gas of thickness L, its intensity is attenuated to a fraction $\exp(-\alpha L)$ with $\alpha = \sigma n$, where $\alpha$ is the coefficient of absorption and $\sigma$ the absorption cross section. If this fraction is too large, (e.g., near unity) too much radiation escapes the slab and is wasted; if it is too small (near zero), radiation is soon depleted and molecules beyond the depletion zone fail to be excited. A good compromise is an attenuation to $\exp(-\alpha L) = e^{-1}$, i.e. $\alpha L = 1$. Preferably a mirror reflects the transmitted radiation back through the gas so that all but a fraction $e^{-2}$ (i.e. 13.5%) of the radiation is absorbed and most molecules have been excited. If, typically, $L=1$ cm, then $\sigma n$ must be 1 cm$^{-1}$. Suppose the limit on collision rates requires an upper limit for the density n of $2.7 \times 10^{15}$ cm$^{-3}$. The cross section then must be about $3.3 \times 10^{-16}$ cm$^2$. This value is at least $10^2$ to $10^3$ larger than most cross sections ordinarily achievable in molecular absorption. However, under the conditions of line narrowing cited before, cross sections in excess of $10^{-15}$ cm$^2$ are easily achievable. To carry this example further, for $v = 3.10^5$ cm/sec and $n = 2.7 \times 10^{15}$ cm$^{-3}$, $N = 10^{21}$ molecules/(sec·cm$^2$). Since a mole has about $6 \times 10^{23}$ molecules, one has a throughput of one mole/cm$^2$ in 5 minutes. It will be apparent from these considerations that in this invention large throughput, high selectivity of excitation, and shielding of the end product from destructive interactions can be obtained simultaneously.

Figure 2:
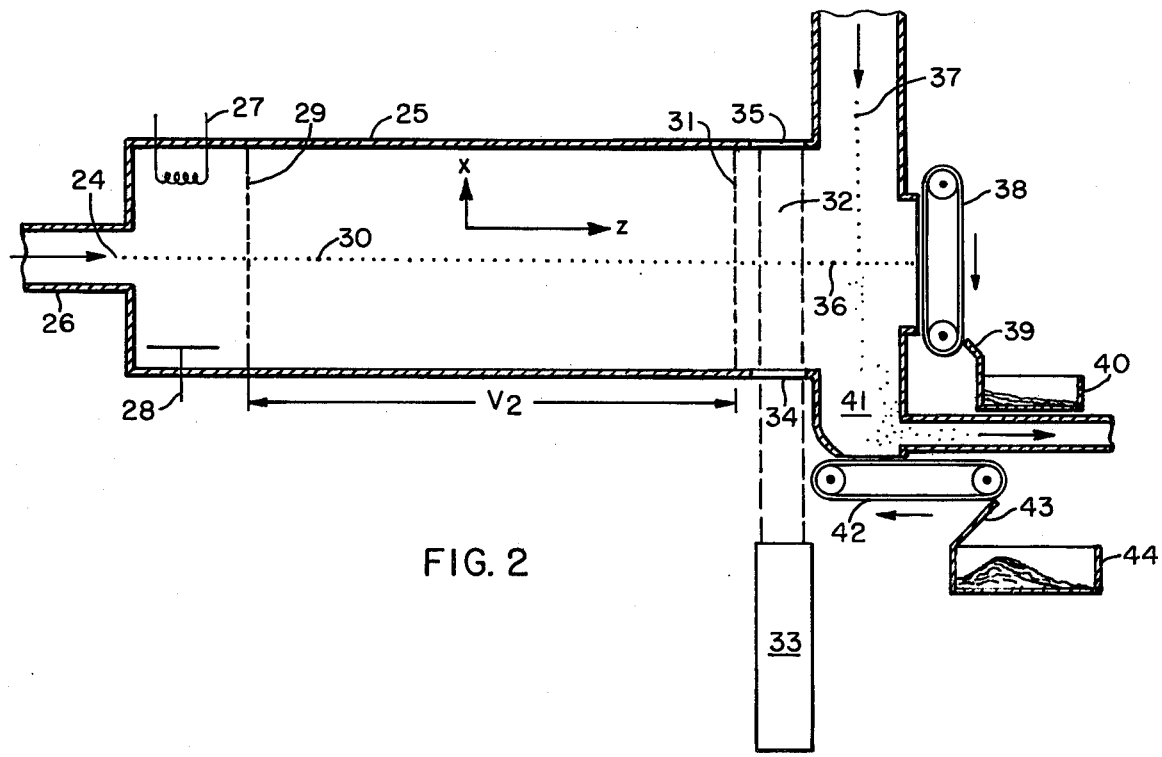
FIG. 2 is another diagrammatic plan view of a second, though not presently preferred, embodiment of a gas dynamic reaction system according to this invention, wherein the activatable gaseous species is an ion.

The construction of the supersonic nozzle in FIG. 1 and the chamber arrangements shown in FIGS. 1 and 2 are schematic. The specific embodiments necessary to achieve the required velocity conditions are well known in the art.

In FIG. 1, an activatable gaseous species 1 is admitted into plenum chamber 2 under high pressure through conduit 3. A unidirectional stream 4 of the gaseous species is released at a supersonic velocity through nozzle 5 into activation chamber 6 where it is irradiated by electromagnetic radiation 7 from narrow bandwidth laser 8 which excites the gaseous species to a level suitable for reaction. The radiation from the laser passes through window 9 in the chamber and is reflected back on itself by mirror 10 on the opposite side of the chamber.

The excited gaseous species 11 then passes through nozzle 12 into reaction chamber 13 where it encounters reactive gaseous species 14 from conduit 15 with which at least part of the stream reacts. The product of reaction and the unreacted species 16 proceed to strike cooled moving belt 17 on which the higher-boiling products condense. These products are removed by scraper 18 and are collected in pan 19. The lower boiling products pass through exhausted conduit 20 and strike moving belt 21, cooled to a lower temperature than belt 17, and are removed by scraper 22 into pan 23. Chamber 13 may be eliminated for certain applications not requiring a second gas, such as certain isotope separations.

There are 3 modes of operation possible for the apparatus of FIG. 1. First, and preferred for associative reactions, (i.e., reactions between two species), the activatable gas A is already mixed with the reagent gaseous species B in the plenum chamber 2 and conduit 15 is closed. Gases A and B then experience supersonic acceleration after leaving nozzle 5. They react, however, mainly after entering reaction chamber 13 where velocities become subsonic and diffusion becomes dominant, leading to reactive collisions between excited A molecules and reagent molecules B. In the second mode of operation, only gas A is in plenum chamber 2. In this case, it passes after laser excitation into chamber 13 where it encounters and reacts with reactive species 14. In either of these two modes of operation, the product of reaction and the unreacted species are removed as previously described. In a third mode, the activated species dissociates. Hence no reagent B is involved and conduit 15 is closed unless a scavenging gas is admitted through it.

The activatable gaseous species and the reactive gaseous species may be in the form of atoms or molecules. However, it is anticipated that selective chemical reactions may occur also with ions in which specific electronic or vibrational bonds have been excited by laser radiation of narrow bandwidth. The condition of large forward velocities and small transverse velocities is fulfilled, in this case, by an accelerating field between two grids, as shown, in FIG. 2. Gaseous species 24 enter chamber 25 through conduit 26 and is ionized by means of the electric field formed between electrodes 27 and 28 or by one of several other methods well known in the art. A small accelerating field is established between grid 29 and the chamber so as to draw a sufficient number N of ions 30 per sec per cm$^2$ into the accelerating field between grid 29 and grid 31. At grid 29, then, $N = n_1 v_1$ where $n_1$ is the number density of ions entering through grid 29 and $v_1$ is their velocity component in the direction of the accelerating field, the z-direction. The accelerating electric field increases the velocity of the ions in the z-direction so that they pass through grid 31 with a velocity component in the z-direction $$v_2 = \left[\frac{2qV_2}{M}\right]^{\frac{1}{2}}$$

where q and M are the charge and the mass of the ion, respectively. Clearly, the continuity condition requires that if N ions enter grid 29, N ions leave grid 31. Hence $$\frac{n_2}{n_1} = \frac{v_1}{v_2} = \left(\frac{V_1}{V_2}\right)^{\frac{1}{2}}$$

where $V_1$ is the equivalent voltage component in the z-direction corresponding to the velocity $v_1$. Thus, as the grid voltage $V_2$ is increased, density $n_2$ is decreased, whereas the velocity $V_2$ is increased. In particular, one may define an angle of mean divergence from the z-direction:

$$\beta = V_x/V$$

where $V_x$ is the root-mean-square velocity of the ions due to their temperature in the ionization chamber. It is seen that as the accelerating voltage $V_2$ is increased, the divergence assumes small values. It follows that this apparatus provides an essentially unidirectional velocity of the ions so that their absorption of resonance radiation experiences very little Doppler broadening. Again, by virtue of the low density and large forward velocity with which the ions enter the interaction region with the laser, relatively few deactivating collisions between the ions occur before they interact with another reactive species or arrive at a collector in a dissociated state. We have thus preserved a throughput N, while establishing high selectivity of excitation, reaction, and the reaction products.

Accelerated ions 30 encounter substantially monochromatic electromagnetic radiation 32 from laser 33. As before the light passes through window 34 and is reflected back on itself by mirror 35. The excited accelerated species 36 then encounters a reactive gaseous species 37. The products strike cooled moving belt 38 and are removed by scraper 39 into pan 40. The more volatile products and unreacted species pass through evacuated conduit 41, strike cooler moving belt 42, and are removed by scraper 43 into pan 44. This apparatus may be used in a manner similar to the apparatus of FIG. 1.

As an example, the activatable gas may be carbon dioxide and the reactive gas water vapor, or vice versa, which react to produce formaldehyde and oxygen.

In another example, the activatable gas may be a mixture of $U^{235}F_6$ and $U^{238}F_6$ where only the $U^{235}F_6$ is activated to produce $U^{235}F_5$ and $F^-$. The reactive gas may be mixed with hydrogen which scavenges the $F^-$ and forms HF. The $U^{235}F_5$ then condenses first, resulting in a separation of the two isotopes. Recent work has been published on the isotope separation of $^{34}SF_6$ and $^{32}SF_6$, which have the same molecular symmetry as $UF_6$. (See report LA-UR-75-707 of the Los Alamos Scientific Laboratory.)

Another example is using a stream of monomers which are activated and collide with other monomers of the same stream or a second stream to produce polymers.

Supersonic velocities are preferred (in FIG. 1) because the escaping gas cools rapidly which translates the random heat motion (lateral velocity) into a uniform unidirectional velocity and reduces intermolecular collisions. Lower velocities may be used, but the effect is less. It is required, however, that the forward component of velocity of the members of the stream be at least 10 times greater than their lateral velocity, which does not occur in a simple flow of gas (but is easily produced at supersonic velocities). Rather, high pressures and a small opening must be used, the exact pressure necessary depending on the particular gas and its temperature. It is essential that, in all these embodiments, the translational temperature (i.e. temperature in the usual sense) of the gas be as low as possible before entering the interaction region with the laser beam. The gas kinetic velocity $v_{th}$ is given by the equation $$mv_{th}^2/2 = (3/2)kT$$

where m is the mass of the gas, v is its velocity, k is Boltzmann's constant, and T is the temperature.

The gas stream must also be substantially unidirectional in order to minimize Doppler broadening. A stream which deviates less than 5° is considered to be substantially unidirectional. Unidirectionality can be achieved by passing the gas through several pinhole baffles before it is activated or by using supersonic velocities as shown in the drawing. For example, supersonic flow velocities of $3 \cdot 10^5$ cm/sec in the z-direction are possible. On the other hand, considerable cooling of the gas occurs (to near $-200°$ C.) in expansion, so that $v_x$ may be about $10^4$ cm/sec. Hence $B = \tan^{-1}(1/15) = 3.8°$.

The stream is activated by electromagnetic radiation which is substantially monochromatic. It should be understood that even laser light, which is preferred, is not absolutely monochromatic and therefore absolute monochromaticity is not required. In fact, the invention requires only a degree of monochromaticity (i.e. upper limit of radiation bandwidth) which is commensurate with frequency stability, or more specifically, that degree of frequency stability which is economical for the particular reaction. Some reactions, of course, require a smaller radiation bandwidth than others, first to match the gaseous linewidths achieved by the means described in this invention and to achieve thereby a large absorption cross section; and second, because the desired excitation state may lie very close to other undesired excitation states. Also, if the bandwidth of the laser is much wider than the resonance linewidth of the molecule, a large fraction of the radiation power fails to excite the desired energy level and thus is wasted. The excitation is preferably vibrational rather than electronic because vibrational excitation is more conductive to chemical reaction. Thus, infrared radiation (about 2 to 20 microns in wavelength) is preferred as it tends to cause vibrational excitation rather than electronic excitation. For example, in a triatomic molecule, vibrational excitation may be in the symmetric stretch mode, asymmetric stretch mode, or bending mode since all modes facilitate reaction. The light frequency, of course, must be selected to equal the excitation energy required for the particular excitation state desired according to the equation $\nu = E/h$, where $\nu$ is the light frequency, E is the energy, and h is Planck's constant. The frequency of a particular excitation state can be determined experimentally or by absorption spectroscopy. For example, the frequency required to excite carbon dioxide to react with water vapor can be about 2350 cm$^{-1}$, and vice versa is 5400 cm$^{-1}$, and the frequency for disassociating $U^{235}F_6$ into $U^{235}F_5$ can be about 625 cm$^{-1}$.

The radiation is preferably normal to the stream in order to minimize Doppler broadening. Doppler broadening can be further limited by reflecting the light back on itself as shown in the drawing, an effect described by B. Cagnac, B. Grynberg, and F. Biraben in an article titled "Spectroscopic D'Absorption Multiphontonique Ions Effect Doppler" in the Journal de Physique, Vol. 34, pages 845 to 858. Excitation may also be achieved in more than one step, by subjecting the molecules in the stream to multi-photon excitation, each molecule receiving successive energy quanta of equal or different magnitude.

If a second stream of particles is used, as shown in the drawings, the second stream should intersect with the first stream at an angle between 0° (moving in same direction) and 90° to avoid intermixing before activation. The ratio of the first gas to the second may not be stoichiometric, and may be determined by experiment. While it usually may not be necessary, the second gas may be selectively excited also so that two molecules react chemically, each excited in a particular bond by the corresponding selective frequencies. Of course, the travel time from point of excitation of the first gas to its intersection with the second gas must be less than the radiative delay time of the excited first gas.

After interaction and reaction with the second stream the product should be quickly removed from the reaction area so that it does not interfere with the reaction or further react. This may be accomplished as shown in the drawing by quenching (cooling rapidly) causing the product to condense, or by other means.

I claim:
1. An apparatus comprising
   (A) a chamber;
   (B) means for producing a unidirectional stream of an isotopically mixed gas moving across said chamber. the individual members of which have a forward component of velocity at least 10 times greater than their lateral component of velocity;
   (C) means for producing a substantially monochromatic light beam directed at said stream in said chamber, said light having a frequency which preferentially activated an isotopic species of said gas to an excitation state suitable for chemical reaction, said light beam being incapable of significantly deflecting activated members from non-activated members in said stream;
   (D) a single exit from said chamber for said stream, whereby said activated members and said non-activated members travel intermixed through said exit; and
   (E) means for collecting said stream after it has passed through said exit, said apparatus being free of means for non-gaseous material contact with said stream other than said means for collecting.

2. An apparatus according to claim 1 wherein said light beam is normal to said unidirectional stream.

3. An apparatus according to claim 1 wherein said unidirectional stream species moves at a supersonic forward velocity.

4. An apparatus according to claim 1 wherein said unidirectional gas stream is $UF_6$ which is activated to produce $UF_5$ and $F^-$.

5. An apparatus according to claim 4 wherein hydrogen is used to scavange the F ions by forming HF.

6. An apparatus according to claim 1 wherein said activation is a vibrational excitation.

7. An apparatus according to claim 6 wherein said light has a wavelength of about 2 to about 20 microns.

8. An apparatus according to claim 1 including means for producing said second gas stream and directing it at said unidirectional stream after light has activated some of its members, said second gas stream being capable of reacting with the activated members of said unidirectional stream.

9. An apparatus according to claim 8 including a reaction zone where said gas streams can react, and means for removing the product of the reaction from the reaction zone.

10. An apparatus according to claim 8 wherein said means for removing said product is a cooled moving belt upon which at least part of said product condenses.

11. An apparatus according to claim 8 wherein the angle between said gas streams is 0° to 90°.

12. An apparatus according to claim 8 wherein said gas streams are different and are selected from the groups consisting of carbon dioxide and water vapor, and the product of their reaction is formaldehyde.

13. An apparatus according to claim 1 including a mirror opposite said light beam which reflects said light beam back upon itself.

14. An apparatus according to claim 1 wherein said means for producing a substantially monochromatic light beam is a laser.

15. An apparatus according to claim 1 including means for ionizing and said unidirectional gas stream and an electric field for accelerating the ions to obtain and forward component of velocity.

16. A method of preferentially activating an isotopic species in an isotopically mixed gas comprising producing a moving, unidirectional stream of said gas, the individual members of which have a forward component of velocity at least 10 times greater than their lateral component of velocity, directing a substantially monochromatic light beam at said stream, said light having a frequency which preferentially activates an isotopic species of said gas to an excitation state suitable for chemical reaction, said light beam being incapable of significantly deflecting activated members from non-activated members in said stream, and permitting said activated members and said non-activated members to travel intermixed together as a single stream without contact with non-gaseous matter until collected.

17. A method according to claim 16 wherein said unidirectional stream moves at a supersonic forward velocity.

18. A method according to claim 16 wherein said unidirectional gas stream is $UF_6$ which is activated to produce $UF_5$ and $F^-$.

19. A method according to claim 18 wherein hydrogen is used to scavenge the F ions by forming HF.

20. A method according to claim 16 wherein said activation is a vibrational excitation.

21. A method according to claim 20 wherein the wavelength of said light is about 2 to about 20 microns.

22. A method according to claim 16 including directing a second gas stream at said unidirectional gas stream after light has activated some of its members, said second gas stream being capable of reacting with the activated members of said unidirectional stream.

23. A method according to claim 22 wherein said gas streams react in a reaction zone and the product of the reaction is removed from the reaction zone.

24. A method according to claim 23 wherein said product is removed from said reaction zone by a cooled moving belt upon which said product condenses.

25. A method according to claim 22 wherein the angle between said gas stream is 0° to 90°.

26. A method according to claim 16 wherein said light beam is reflected back upon itself.

27. A method according to claim 16 wherein said gas streams are different and are selected from the group consisting of carbon dioxide and water vapor.

28. A method according to claim 16 wherein said unidirectional gas stream is ionized and accelerated in an electric field.